United States Patent
Xi et al.

(10) Patent No.: US 8,611,040 B1
(45) Date of Patent: Dec. 17, 2013

(54) DISK DRIVE ADJUSTING MICROACTUATOR GAIN BY INJECTING A SINUSOID INTO A SERVO CONTROL SYSTEM

(71) Applicant: Western Digital Technologies, Inc., Irvine, CA (US)

(72) Inventors: Wei Xi, Mission Viejo, CA (US); Young-Hoon Kim, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/628,660

(22) Filed: Sep. 27, 2012

(51) Int. Cl.
*G11B 5/596* (2006.01)
*G11B 21/02* (2006.01)

(52) U.S. Cl.
USPC .................................. 360/78.05; 360/78.09

(58) Field of Classification Search
None
See application file for complete search history.

(56) References Cited

U.S. PATENT DOCUMENTS

| | | | |
|---|---|---|---|
| 5,447,051 A | 9/1995 | Hanks et al. | |
| 5,491,682 A | 2/1996 | Dohmeier et al. | |
| 5,852,524 A | 12/1998 | Glover et al. | |
| 6,088,187 A | 7/2000 | Takaishi | |
| 6,094,973 A | 8/2000 | Novotny | |
| 6,160,676 A | 12/2000 | Takaishi | |
| 6,204,988 B1 | 3/2001 | Codilian et al. | |
| 6,263,251 B1 | 7/2001 | Rutschmann | |
| 6,369,971 B1 | 4/2002 | Everett | |
| 6,510,752 B1 | 1/2003 | Sacks et al. | |
| 6,546,296 B1 | 4/2003 | Hara | |
| 6,563,665 B1 | 5/2003 | Ell | |
| 6,707,633 B2 * | 3/2004 | Okuyama et al. | 360/78.05 |
| 6,724,563 B2 * | 4/2004 | Kobayashi et al. | 360/78.05 |
| 6,741,417 B2 | 5/2004 | Hsin et al. | |
| 6,747,837 B1 | 6/2004 | Bennett | |
| 6,861,854 B1 | 3/2005 | Guo et al. | |
| 6,888,694 B2 | 5/2005 | Guo et al. | |
| 6,898,039 B2 * | 5/2005 | Kobayashi et al. | 360/78.09 |
| 6,956,711 B2 | 10/2005 | Hanson et al. | |
| 6,975,477 B1 | 12/2005 | Hu et al. | |
| 7,019,938 B2 | 3/2006 | Miyata et al. | |
| 7,072,134 B1 * | 7/2006 | Hirano et al. | 360/55 |
| 7,075,748 B2 * | 7/2006 | White et al. | 360/78.05 |
| 7,079,338 B1 * | 7/2006 | Semba et al. | 360/75 |
| 7,079,339 B1 * | 7/2006 | Semba et al. | 360/75 |

(Continued)

OTHER PUBLICATIONS

M. Kobayshi, S. Nakagawa, H. Numasato, "Adaptive Control of Dual-Stage Actuator for Hard Disk Drives", Proceeding of the 2004 American Control Conference, Boston, Massachusetts Jun. 30-Jul. 2, 2004.

(Continued)

*Primary Examiner* — Hoa T Nguyen
*Assistant Examiner* — James L Habermehl (57) ABSTRACT

A disk drive is disclosed comprising a head, a disk surface, and a dual stage actuator (DSA) servo loop comprising a voice coil motor (VCM) servo loop and a microactuator servo loop operable to actuate the head over the disk surface. A microactuator compensator in the microactuator servo loop is disabled, a sinusoid is injected into a control signal applied to the microactuator, and coefficients of a corresponding sinusoidal response in a DSA error signal of the DSA servo loop is measured. The sinusoid is injected into a model of the microactuator to generate a compensation signal. A gain of the microactuator is adjusted based on a VCM error signal and the coefficients of the sinusoidal response in the DSA error signal.

24 Claims, 4 Drawing Sheets

(56) References Cited

U.S. PATENT DOCUMENTS

| | | |
|---|---|---|
| 7,106,552 B2 | 9/2006 | Hirano et al. |
| 7,124,654 B1 | 10/2006 | Davies et al. |
| 7,136,257 B2 | 11/2006 | Zhang et al. |
| 7,265,936 B1 | 9/2007 | Lee et al. |
| 7,283,321 B1 | 10/2007 | Sun et al. |
| 7,342,740 B1 | 3/2008 | Lee et al. |
| 7,385,780 B2 | 6/2008 | Kim et al. |
| 7,392,687 B2 | 7/2008 | Huang et al. |
| 7,423,837 B2 | 9/2008 | Hutsell |
| 7,474,496 B1 | 1/2009 | Sun et al. |
| 7,538,971 B2 | 5/2009 | Sun et al. |
| 7,576,940 B2 | 8/2009 | Lee et al. |
| 7,626,782 B1 | 12/2009 | Yu et al. |
| 7,826,170 B2 | 11/2010 | Semba |
| 7,869,157 B2 | 1/2011 | Nagashima et al. |
| 8,254,222 B1 | 8/2012 | Tang |
| 8,335,049 B1 * | 12/2012 | Liu et al. ............. 360/78.05 |
| 8,467,144 B2 * | 6/2013 | Lim et al. ............. 360/78.05 |
| 2001/0036034 A1 | 11/2001 | Chang et al. |
| 2002/0176201 A1 | 11/2002 | Hsin et al. |
| 2004/0228027 A1 | 11/2004 | Zhang et al. |
| 2005/0146807 A1 | 7/2005 | Huang et al. |
| 2007/0223136 A1 | 9/2007 | Hutsell |
| 2008/0129305 A1 | 6/2008 | Perryman et al. |
| 2008/0310046 A1 | 12/2008 | Menegoli et al. |
| 2009/0310250 A1 | 12/2009 | Nagashima et al. |
| 2010/0238588 A1 | 9/2010 | Drouin et al. |

OTHER PUBLICATIONS

R. Conway, J. Choi, R. Nagamune, R. Horowitz, "Robust Track-Following Controller Design in Hard Disk Drives Based on Parameter Dependent Lyapunov Functions", IEEE Transactions on Magnetics, vol. 46, No. 4, Apr. 2010.

Y. Kim, S. Chu, S. Kang, "Servo design for high-TPI computer disk drives using a delayaccommodating state estimator," Microsystem technologies, vol. 11, No. 8, pp. 696-701, 2005.

Z. Gao T. Breikin, H. Wang, "Discrete-time proportional and integral observer and observer-based controller for systems with both unknown input and output disturbances," Optimal Control Applications and Methods, vol. 29, No. 3, pp. 171-189, 2008.

M. Krstic, I. Kanellakopolous P.V. Kokotovic, "Nonlinear and Adaptive Control Design", New York: Wiley, 1995, pp. 388-393.

G. Franklin, D. Powell, M. Workman, Digital control dynamic systems, 1997, pp. 56-61.

* cited by examiner

DISK DRIVE ADJUSTING MICROACTUATOR GAIN BY INJECTING A SINUSOID INTO A SERVO CONTROL SYSTEM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Figure 1:
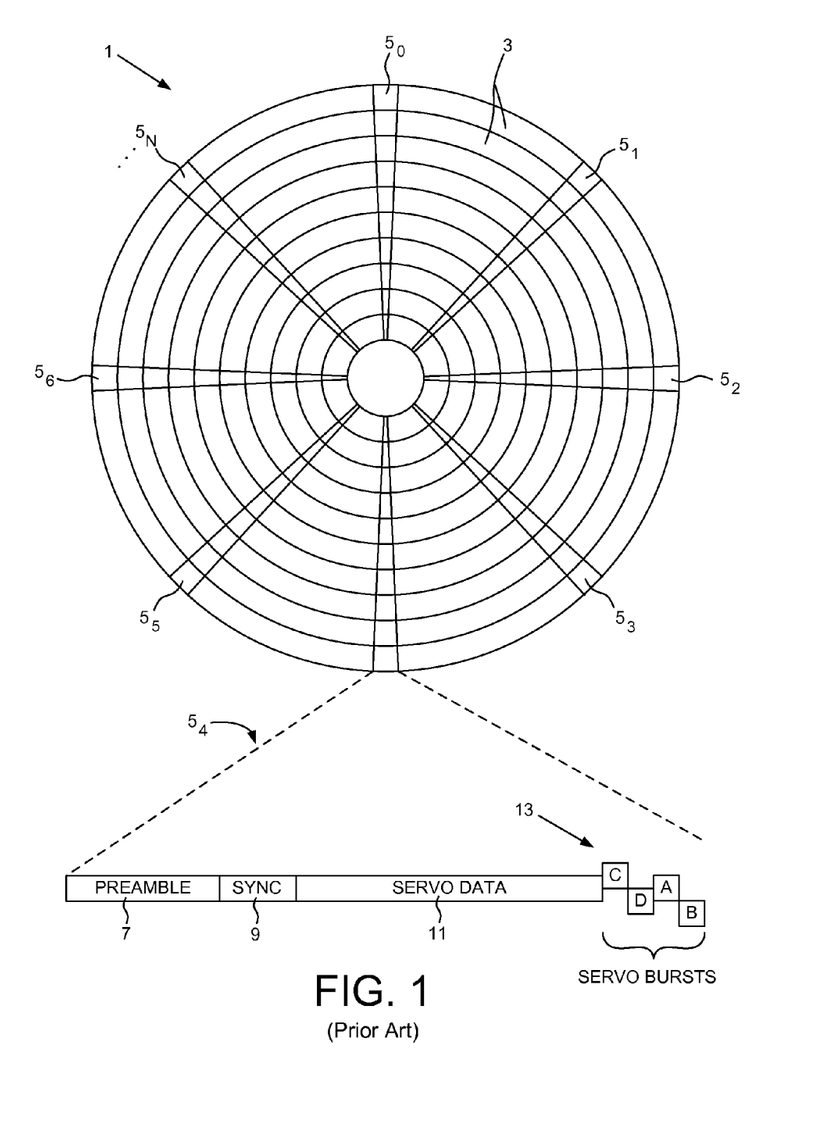
FIG. 1 shows a prior art disk format comprising servo tracks defined by servo sectors.

FIG. 1 shows a prior art disk format 1 as comprising a number of servo tracks 3 defined by servo sectors $5_0$-$5_N$ recorded around the circumference of each servo track, wherein a plurality of data tracks are defined relative to the servo tracks. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the servo track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

DETAILED DESCRIPTION OF EMBODIMENTS OF THE INVENTION

Figure 2A:
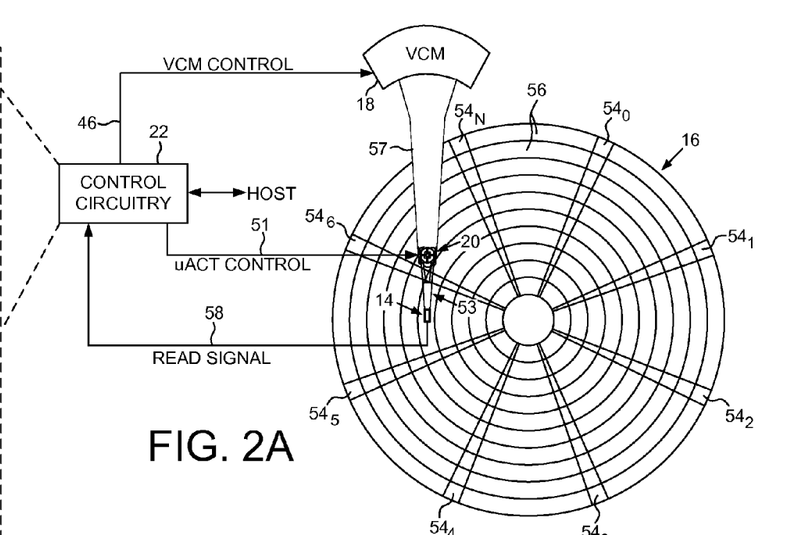
FIG. 2A shows a disk drive according to an embodiment of the present invention comprising a head actuated over a disk by a VCM and microactuator.

FIG. 2A shows a disk drive according to an embodiment of the present invention comprising a head 14, a disk surface 16, and a dual stage actuator (DSA) servo loop (FIG. 2B) comprising a voice coil motor (VCM) servo loop comprising a VCM 18 and a microactuator servo loop comprising a microactuator 20 operable to actuate the head 14 over the disk surface 16. The disk drive further comprises control circuitry 22 operable to execute the flow diagram of FIG. 2C, wherein a microactuator compensator 24 in the microactuator servo loop is disabled (block 26), and after disabling the microactuator compensator 24, a sinusoid 28 is injected into a control signal 30 applied to the microactuator 20 (block 32). Coefficients of a corresponding sinusoidal response in a DSA error signal of the DSA servo loop are measured (block 34). The sinusoid is injected into a model of the microactuator 36 to generate a compensation signal 38 (block 40). A VCM error signal 42 of the VCM servo loop is generated based on the DSA error signal and the compensation signal 38 (block 44). A VCM control signal 46 is generated based on the VCM error signal 42 (block 48), and a gain 50 of the microactuator 20 is adjusted based on the VCM error signal 42 and the coefficients of the sinusoidal response in the DSA error signal (block 52).

Figure 2B:
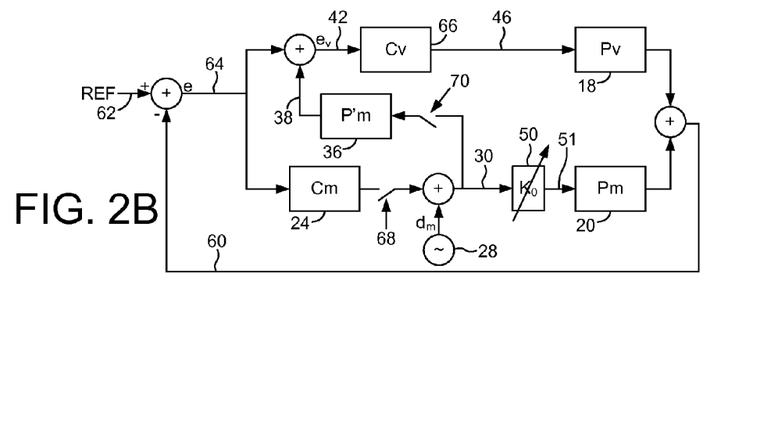
FIG. 2B shows a dual stage actuator (DSA) servo loop comprising a voice coil motor (VCM) servo loop and a microactuator servo loop according to an embodiment of the present invention.

In the embodiment of FIG. 2A, the disk 16 comprises embedded servo sectors $54_0$-$54_N$ that define a plurality of servo tracks 56, wherein data tracks are defined relative to the servo tracks (at the same or different radial density). The control circuitry 22 process a read signal 58 emanating from the head 14 to demodulate the servo sectors $54_0$-$54_N$ into an estimated position 60 (FIG. 2B). The estimated position 60 is subtracted from a reference position 62 to generate a position error signal (PES) 64 representing an error between the actual position of the head and a target position relative to a target track. The PES 64 is filtered by the microactuator compensator 24 to generate the microactuator control signal 30 applied to the gain block 50 of the microactuator 20. The gain block 50 amplifies the control signal 30 to generate a control signal 51 applied to the microactuator 20 which actuates a suspension 53 coupled to a distal end of an actuator arm 57. The VCM error signal 42 is applied to a VCM compensator 66 to generate the VCM control signal 46 that is applied to a voice coil motor (VCM) 18 which rotates the actuator arm 57 about a pivot. The servo sectors $54_0$-$54_N$ may comprise any suitable position information, such as a track address for coarse positioning and servo bursts for fine positioning. The servo bursts may comprise any suitable pattern, such as an amplitude-based servo pattern (e.g., the quadrature servo pattern shown in FIG. 1), or a suitable phase-based servo pattern.

Any suitable microactuator 20 may be employed in the embodiments of the present invention, such as a suitable piezoelectric microactuator. Further, the microactuator 20 may actuate the head 14 over the disk 16 in any suitable manner, such as by actuating a suspension 53 relative to the actuator arm 57 as in FIG. 2A, or by actuating a slider relative to the suspension 53. In one embodiment, a nominal frequency response of the microactuator 20 is determined (theoretically or empirically) and used to configure the model of the microactuator 36. However, the gain of the microactuator 20 may deviate from the nominal value over time due, for example, to changes in environmental conditions (e.g., temperature) or general degradation of the microactuator 20. Accordingly, in one embodiment the gain of the microactuator 20 is adjusted (by adjusting gain block 50) in order to maintain a target frequency response and overall performance of the DSA servo loop. The gain block 50 may be implemented in any suitable manner, such as an adjustable analog amplifier or a digital amplifier followed by a digital-to-analog converter.

In one embodiment, when measuring the coefficients of the sinusoidal response in the DSA error signal, the microactuator compensator 24 is disabled by opening switch 68, and the model of the microactuator 36 is disabled by opening switch 70. The sinusoid 28 is injected into the control signal 30 applied to the microactuator 20, and the sinusoidal response in the PES 64 is measured (i.e., the DSA error signal comprises the PES 64). Any suitable technique may be employed to measure the sinusoidal response in the PES 64, such as by performing a Fourier transform on the PES 64 at the frequency of the sinusoid 28 in order to establish the amplitude and phase of the sinusoidal response (and corresponding coefficients). In another embodiment, coefficients of a sinusoid may be adapted using an iterative learning procedure that minimizes the difference between the measured sinusoidal response and the actual sinusoidal response in the PES 64. In one embodiment, this iterative learning procedure is understood from the following iterative equation:

$$a(k)=a(k-1)+\mu e(k)d_m(k)$$

$$b(k)=b(k-1)+\mu e(k)d_m^c(k)$$

$$\hat{y}(k)=a(k)d(k)+b(k)d^c(k)$$

$$e(k)=y(k)-\hat{y}(k)$$

where:
a and b are the coefficients of the sinusoidal response in the PES 64;
$d_m$ is the sinusoid 28;
$d_m^c$ equals $$d_m \cdot e^{-j\frac{\pi}{2}};$$

$\mu$ is a learning coefficient;
y(k) represents the actual sinusoidal response (the PES 64);
$\hat{y}(k)$ represents the measured sinusoidal response in the PES 64; and
e(k) represents the difference between the measured sinusoidal response and the actual sinusoidal response in the PES 64. In one embodiment, the above iterative equation is executed until the error e(k) falls below a threshold.

After measuring the coefficients of the sinusoidal response in the DSA error signal (e.g., in the PES 64), the model of the microactuator 36 is enabled by closing switch 70. The sinusoid 28 is then injected into to the control signal 30 applied to the microactuator 20 (through gain block 50), and injected into the model of the microactuator 36. In one embodiment, the gain of the microactuator 20 is then adjusted based the following iterative equation:

$$K_0(k)=(1-\gamma(k))K_0(k-1)-\gamma(k)e_v(k)(a \cdot d_m(k)+b \cdot d_m^c(k))$$

where:
$K_0$ is the gain of the microactuator (gain block 50);
$\gamma$ is a learning coefficient;
$d_m$ is the sinusoid 28;
$d_m^c$ equals $$d_m \cdot e^{-j\frac{\pi}{2}};$$

a and b are the coefficients of the sinusoidal response in the DSA error signal; and $e_v$ is the VCM error signal 42. In one embodiment, the above iterative equation may be executed by adjusting the gain of the microactuator until the VCM error signal 42 falls below a threshold.

In one embodiment, an effect of the above iterative process is to substantially match the gain of the microactuator 20 to a gain of the model of the microactuator 36. For example, in one embodiment the model of the microactuator 36 represents a desired response needed to maintain a corresponding performance of the DSA servo loop. When the actual gain of the microactuator 20 changes over time (e.g., due to temperature or degradation), the above iterative process is executed in order to adjust the gain block 50 and thereby match the actual gain of the microactuator 20 to the gain of the model 36. Once the gain block 50 has been adjusted such that the VCM error signal 42 falls below a threshold, the switch 68 is closed in order to enable the microactuator compensator 24 during normal operation of the DSA servo loop.

Figure 3A:
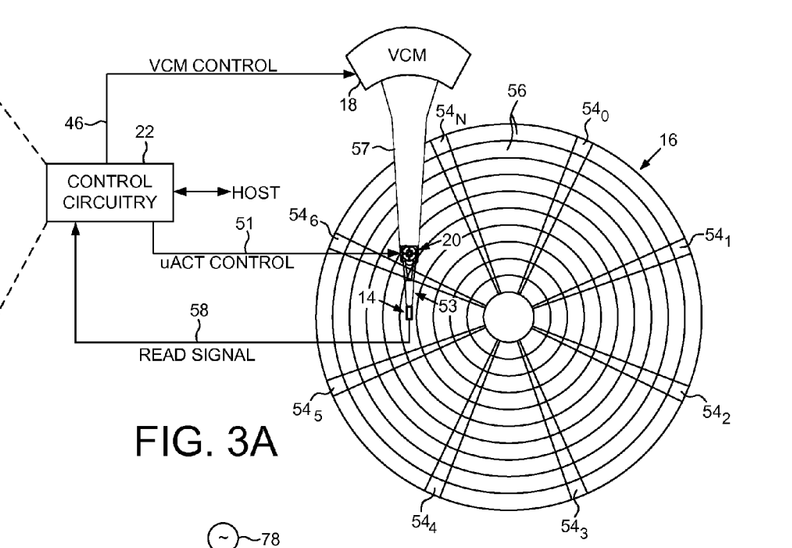
FIG. 3A shows a disk drive according to an embodiment of the present invention comprising a head actuated over a disk by a VCM and microactuator.

FIG. 3A shows a disk drive according to an embodiment of the present invention comprising a head 14, a disk surface 16, and a dual stage actuator (DSA) servo loop (FIG. 3B) comprising a VCM servo loop comprising a VCM 18 and a microactuator servo loop comprising a microactuator 20 operable to actuate the head 14 over the disk surface 16. The disk drive further comprises control circuitry 22 operable to execute the flow diagram of FIG. 3C, wherein a gain 50 of the microactuator 20 is initialized (block 72), and a sinusoid 74 is injected into the microactuator servo loop (block 76). A corresponding feed-forward control signal 78 is generated in the VCM servo loop that compensates for an effect of the sinusoid 74 on a DSA error signal (block 80), and a change in the gain of the microactuator is detected in response to the DSA error signal (block 82).

Figure 2C:
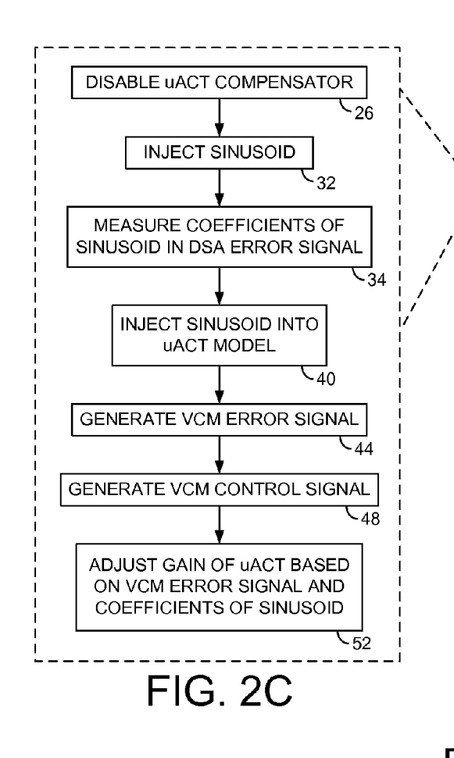
FIG. 2C is a flow diagram wherein a gain of the microactuator is adjusted based on a sinusoidal response in a DSA error signal of the DSA servo loop according to an embodiment of the present invention.
Figure 3B:
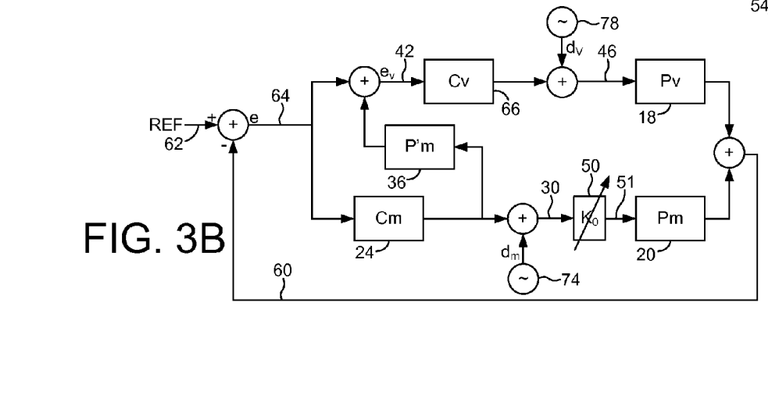
FIG. 3B shows a dual stage actuator (DSA) servo loop comprising a voice coil motor (VCM) servo loop and a microactuator servo loop according to an embodiment of the present invention.
Figure 3C:
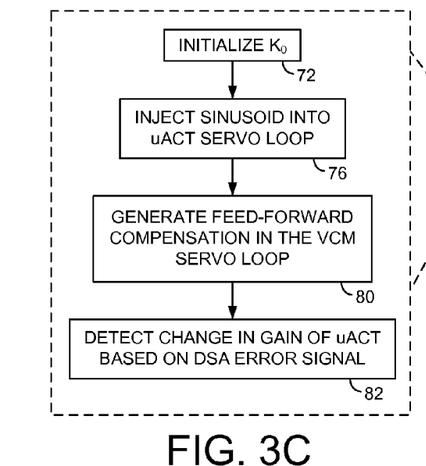
FIG. 3C is a flow diagram wherein a sinusoid is injected into the microactuator control signal, a feed-forward control signal compensates for the resulting sinusoidal movement of the head, and a change in the gain of the microactuator is detected based on a sinusoidal response in a DSA error signal according to an embodiment of the present invention.

In one embodiment, the gain 50 of the microactuator 20 may be initialized to a nominal value at block 72 of FIG. 3C based on a theoretical analysis of the design characteristics, or based on an empirical analysis of a representative group of microactuators. In another embodiment, the gain 50 of the microactuator 20 may be initialized by executing the flow diagram of FIG. 2C for each individual disk drive in order to match the microactuator gain to the model of the microactuator 36 in the DSA servo loop.

The feed-forward control signal 78 in the DSA servo loop (FIG. 3B) may be generated in any suitable manner. In one embodiment, the feed-forward control signal 78 is generated by generating coefficients of a sinusoid representing the sinusoidal response in the DSA error signal (e.g., PES 64) due to injecting the sinusoid 74 into the microactuator servo loop. Any suitable technique may be employed to measure the sinusoidal response in the PES 64, such as by performing a Fourier transform on the PES 64 at the frequency of the sinusoid 74 in order to establish the amplitude and phase of the sinusoidal response (and corresponding coefficients) in the PES 64. In another embodiment, coefficients of a sinusoid representing the feed-forward control signal 78 may be adapted using an iterative learning procedure until the PES 64 falls below a threshold. This iterative learning procedure is understood from the following iterative equation:

$$\alpha(k)=\alpha(k-1)+\mu e(k)d_m(k)$$

$$\beta(k)=\beta(k-1)+\mu e(k)d_m^c(k)$$

$$d_v(k)=\alpha(k)d(k)+\beta(k)d^c(k)$$

where:
$\alpha$ and $\beta$ are the coefficients of the sinusoid $d_v(k)$ representing the feed-forward control signal 78;

$d_m$ is the sinusoid 74 (or any suitable sinusoid);
$d_m^c$ equals $$d_m \cdot e^{-j\frac{\pi}{2}};$$

μ is a learning coefficient;
$d_v(k)$ represents the feed-forward control signal 78; and
e represents the PES 64. In one embodiment, the above iterative equation is executed until the PES 64 falls below a threshold.

In another embodiment, the control circuitry 22 may be operable to generate the feed-forward control signal 78 in the VCM servo loop shown in FIG. 3B in response to coefficients of a sinusoidal response of the DSA servo loop measured while initializing the gain block 50 (at block 72 of FIG. 3C) based on the technique described above with reference to the flow diagram of FIG. 2C. That is, the sinusoidal response measured when initializing the gain block 50 of the microactuator 20 (with the microactuator compensator 24 disabled) may be similar in phase to the sinusoidal response in the PES 64 when injecting the sinusoid 74 into the microactuator servo loop shown in FIG. 3B (with the microactuator compensator 24 enabled). Accordingly, in this embodiment the above iterative equation may be modified to:

$$\alpha(k)=\alpha(k-1)+\mu e(k)(a \cdot d_m(k)+b \cdot d_m^c(k))$$

$$\beta(k)=\beta(k-1)+\mu e(k)(a \cdot d_m(k)-b \cdot d_m^c(k))$$

$$d_v(k)=\alpha(k)d(k)+\beta(k)d^c(k)$$

where a and b are the coefficients of the sinusoidal response of the DSA servo loop measured when initializing the gain block 50 of the microactuator 20 based on the flow diagram of FIG. 2C described above.

Once the feed-forward control signal 78 has been generated as described above and is injected into the VCM servo loop, it will compensate for the effect of the sinusoid 74 on the PES 64 as long as the gain of the microactuator 20 does not change. Accordingly, in one embodiment a change in the gain of the microactuator 20 (e.g., due to environmental conditions or degradation over time) may be detected by detecting a change in the DSA error signal (e.g., the PES 64). In one embodiment, the control circuitry 22 is operable to detect the change in the gain of the microactuator based on:

$$\frac{2}{N(a^2+b^2)\|d_m\|^2}\sum_{k=1}^{N}e(k)(a \cdot d_m(k)+b \cdot d_m^c(k))$$

where:
$d_m$ is the sinusoid 74;
$d_m^c$ equals $$d_m \cdot e^{-j\frac{\pi}{2}};$$

a and b are the coefficients of the sinusoidal response of the DSA servo loop;
e is the DSA error signal (e.g., the PES 64); and
N is an integer number of samples of the DSA error signal.
In one embodiment, the gain of the microactuator 20 is adjusted (e.g., by adjusting gain block 50) when the output of the above equation exceeds a threshold. The above iterative equation may be executed during normal operation of the disk drive (with the microactuator compensator 24 enabled) in order to monitor and detect a change in the gain of the microactuator without disrupting host access commands.

In one embodiment, the gain of the microactuator 20 may be adjusted based on the technique described above with reference to the flow diagram of FIG. 2C (i.e., with the microactuator compensator 24 disabled). In another embodiment, the gain of the microactuator 20 may be adjusted with the microactuator compensator 24 enabled based on the following iterative equation:

$$K_0(k)=(1-\gamma(k))K_0(k-1)-\gamma(k)e(k)(a \cdot d_m(k)+b \cdot d_m^c(k))$$

where:
$K_0$ is the gain of the microactuator (gain block 50);
γ is a learning coefficient;
$d_m$ is the sinusoid;
$d_m^c$ equals $$d_m \cdot e^{-j\frac{\pi}{2}};$$

a and b are the coefficients of the sinusoidal response of the DSA servo loop; and
e is the DSA error signal (e.g., the PES 64). In one embodiment, the above iterative equation may be executed by adjusting the gain of the microactuator until the DSA error signal falls below a threshold. The above iterative equation may be executed during normal operation of the disk drive (with the microactuator compensator 24 enabled) in order to adjust the gain block 50 without disrupting host access commands.

Figure 3D:
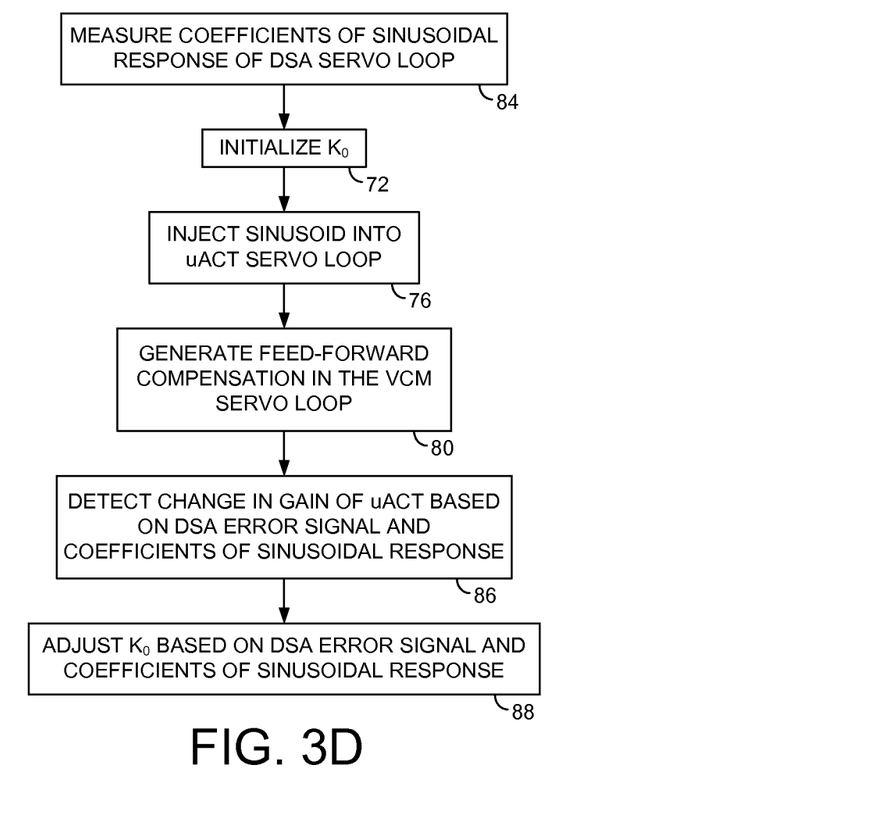
FIG. 3D is a flow diagram according to an embodiment of the present invention wherein when a gain change of the microactuator is detected, the gain is adjusted based on a DSA error signal and a sinusoidal response of the DSA servo loop.

FIG. 3D is a flow diagram representing the above-described procedure for detecting a change in the gain of the microactuator, and making a corresponding adjustment to the gain block 50. Coefficients a and b of a sinusoidal response of the DSA servo loop are measured (block 84), such as described above with reference to the flow diagram of FIG. 2C. The gain block 50 is initialized (block 72), a sinusoid 74 is injected into the microactuator servo loop (block 76), and a feed-forward control signal 78 in the VCM servo loop is generated (block 80). A change in the gain of the microactuator is detected based on a DSA error signal (e.g., PES 64) and the coefficients a and b of a sinusoidal response of the DSA servo loop (block 86). The gain block 50 is then adjusted based on the DSA error signal and the coefficients a and b of the sinusoidal response of the DSA servo loop (block 88).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a head;
a disk surface;
a dual stage actuator (DSA) servo loop comprising a voice coil motor (VCM) servo loop comprising a VCM and a microactuator servo loop comprising a microactuator operable to actuate the head over the disk surface; and
control circuitry operable to:
disable a microactuator compensator in the microactuator servo loop; and
after disabling the microactuator compensator:
inject a sinusoid into a control signal applied to the microactuator and measure coefficients of a corresponding sinusoidal response in a DSA error signal of the DSA servo loop;
inject the sinusoid into a model of the microactuator to generate a compensation signal;
generate a VCM error signal of the VCM servo loop based on the DSA error signal and the compensation signal;
generate a VCM control signal based on the VCM error signal; and
adjust a gain of the microactuator based on the VCM error signal and the coefficients of the sinusoidal response in the DSA error signal.

2. The disk drive as recited in claim 1, wherein the control circuitry is operable to disable the model of the microactuator while measuring the coefficients of the sinusoidal response in the DSA error signal.

3. The disk drive as recited in claim 1, wherein the control circuitry is further operable to adjust the gain of the microactuator based on:

$$K_0(k)=(1-\gamma(k))K_0(k-1)-\gamma(k)e_v(k)(a \cdot d_m(k)+b \cdot d_m^c(k))$$

where:
$K_0$ is the gain of the microactuator;
$\gamma$ is a learning coefficient;
$d_m$ is the sinusoid;
$d_m^c$ equals $$d_m \cdot e^{-j\frac{\pi}{2}};$$

a and b are the coefficients of the sinusoidal response in the DSA error signal; and
$e_v$ is the VCM error signal.

4. The disk drive as recited in claim 3, wherein the control circuitry is operable to adjust the gain of the microactuator until the VCM error signal falls below a threshold.

5. The disk drive as recited in claim 3, wherein the control circuitry is operable to adjust the gain of the microactuator to substantially match a gain of the model of the microactuator.

6. The disk drive as recited in claim 1, wherein the control circuitry is operable to adjust the gain of the microactuator to substantially match a gain of the model of the microactuator.

7. A disk drive comprising:
a head;
a disk surface;
a dual stage actuator (DSA) servo loop comprising a voice coil motor (VCM) servo loop comprising a VCM and a microactuator servo loop comprising a microactuator operable to actuate the head over the disk surface; and
control circuitry operable to:
initialize a gain of the microactuator;
inject a sinusoid into the microactuator servo loop and generate a corresponding feed-forward control signal in the VCM servo loop that compensates for an effect of the sinusoid on a DSA error signal; and
detect a change in the gain of the microactuator in response to the DSA error signal.

8. The disk drive as recited in claim 7, wherein the control circuitry is operable to:
measure coefficients of a sinusoidal response of the DSA servo loop; and
detect the change in the gain of the microactuator in response to the DSA error signal and the coefficients of the sinusoidal response of the DSA servo loop.

9. The disk drive as recited in claim 8, wherein the control circuitry is operable to detect the change in the gain of the microactuator based on:

$$\frac{2}{N(a^2+b^2)\|d_m\|^2}\sum_{k=1}^{N}e(k)(a \cdot d_m(k)+b \cdot d_m^c(k))$$

where:
$d_m$ is the sinusoid;
$d_m^c$ equals $$d_m \cdot e^{-j\frac{\pi}{2}};$$

a and b are the coefficients of the sinusoidal response of the DSA servo loop;
e is the DSA error signal; and
N is an integer number of samples of the DSA error signal.

10. The disk drive as recited in claim 8, wherein the control circuitry is operable to generate the feed-forward control signal in the VCM servo loop in response to the coefficients of the sinusoidal response of the DSA servo loop.

11. The disk drive as recited in claim 7, wherein the control circuitry is operable to:
measure coefficients of a sinusoidal response of the DSA servo loop; and
adjust the gain of the microactuator in response to the DSA error signal and the coefficients of the sinusoidal response of the DSA servo loop.

12. The disk drive as recited in claim 11, wherein the control circuitry is operable to adjust the gain of the microactuator based on:

$$K_0(k)=(1-\gamma(k))K_0(k-1)-\gamma(k)e(k)(a \cdot d_m(k)+b \cdot d_m^c(k))$$

where:
$K_0$ is the gain of the microactuator;
$\gamma$ is a learning coefficient;
$d_m$ is the sinusoid;
$d_m^c$ equals $$d_m \cdot e^{-j\frac{\pi}{2}};$$

a and b are the coefficients of the sinusoidal response of the DSA servo loop; and
e is the DSA error signal.

13. A method of operating a disk drive, the disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:
- disabling a microactuator compensator in the microactuator servo loop; and
- after disabling the microactuator compensator:
  - injecting a sinusoid into a control signal applied to the microactuator and measure coefficients of a corresponding sinusoidal response in a DSA error signal of the DSA servo loop;
  - injecting the sinusoid into a model of the microactuator to generate a compensation signal;
  - generating a VCM error signal of the VCM servo loop based on the DSA error signal and the compensation signal;
  - generating a VCM control signal based on the VCM error signal; and
  - adjusting a gain of the microactuator based on the VCM error signal and the coefficients of the sinusoidal response in the DSA error signal.

14. The method as recited in claim 13, further comprising disabling the model of the microactuator while measuring the coefficients of the sinusoidal response in the DSA error signal.

15. The method as recited in claim 13, further comprising adjusting the gain of the microactuator based on:

$$K_0(k)=(1-\gamma(k))K_0(k-1)-\gamma(k)e_v(k)(a \cdot d_m(k)+b \cdot d_m^c(k))$$

where:
$K_0$ is the gain of the microactuator;
$\gamma$ is a learning coefficient;
$d_m$ is the sinusoid;
$d_m^c$ equals $$d_m \cdot e^{-j\frac{\pi}{2}};$$

a and b are the coefficients of the sinusoidal response in the DSA error signal; and
$e_v$ is the VCM error signal.

16. The method as recited in claim 15, further comprising adjusting the gain of the microactuator until the VCM error signal falls below a threshold.

17. The method as recited in claim 15, further comprising adjusting the gain of the microactuator to substantially match a gain of the model of the microactuator.

18. The method as recited in claim 13, further comprising adjusting the gain of the microactuator to substantially match a gain of the model of the microactuator.

19. A method of operating a disk drive, the disk drive comprising a head, a disk surface, and a dual stage actuator (DSA) servo loop comprising a voice coil motor (VCM) servo loop comprising a VCM and a microactuator servo loop comprising a microactuator operable to actuate the head over the disk surface, the method comprising:

- initializing a gain of the microactuator;
- injecting a sinusoid into the microactuator servo loop and generate a corresponding feed-forward control signal in the VCM servo loop that compensates for an effect of the sinusoid on a DSA error signal; and
- detecting a change in the gain of the microactuator in response to the DSA error signal.

20. The method as recited in claim 19, further comprising:
- measuring coefficients of a sinusoidal response of the DSA servo loop; and
- detecting the change in the gain of the microactuator in response to the DSA error signal and the coefficients of the sinusoidal response of the DSA servo loop.

21. The method as recited in claim 20, further comprising detecting the change in the gain of the microactuator based on:

$$\frac{2}{N(a^2+b^2)\|d_m\|^2}\sum_{k=1}^{N}e(k)(a \cdot d_m(k)+b \cdot d_m^c(k))$$

where:
$d_m$ is the sinusoid;
$d_m^c$ equals $$d_m \cdot e^{-j\frac{\pi}{2}};$$

a and b are the coefficients of the sinusoidal response of the DSA servo loop;
e is the DSA error signal; and
N is an integer number of samples of the DSA error signal.

22. The method as recited in claim 20, further comprising generating the feed-forward control signal in the VCM servo loop in response to the coefficients of the sinusoidal response of the DSA servo loop.

23. The method as recited in claim 19, further comprising:
- measure coefficients of a sinusoidal response of the DSA servo loop; and
- adjust the gain of the microactuator in response to the DSA error signal and the coefficients of the sinusoidal response of the DSA servo loop.

24. The method as recited in claim 23, further comprising adjusting the gain of the microactuator based on:

$$K_0(k)=(1-\gamma(k))K_0(k-1)-\gamma(k)e(k)(a \cdot d_m(k)+b \cdot d_m^c(k))$$

where:
$K_0$ is the gain of the microactuator;
$\gamma$ is a learning coefficient;
$d_m$ is the sinusoid;
$d_m^c$ equals $$d_m \cdot e^{-j\frac{\pi}{2}};$$

a and b are the coefficients of the sinusoidal response of the DSA servo loop; and
e is the DSA error signal.

* * * * *